US012613201B2

(12) United States Patent
Chen et al.

(10) Patent No.: US 12,613,201 B2
(45) Date of Patent: *Apr. 28, 2026

(54) RADIOGRAPHIC INSPECTION DEVICE AND METHOD OF INSPECTING OBJECT

(71) Applicants: Tsinghua University, Beijing (CN); NUCTECH COMPANY LIMITED, Beijing (CN)

(72) Inventors: Zhiqiang Chen, Beijing (CN); Li Zhang, Beijing (CN); Yi Cheng, Beijing (CN); Qingping Huang, Beijing (CN); Mingzhi Hong, Beijing (CN); Minghua Qiu, Beijing (CN); Yao Zhang, Beijing (CN); Jianxue Yang, Beijing (CN); Lei Zheng, Beijing (CN)

(73) Assignees: Tsinghua University, Beijing (CN); NUCTECH COMPANY LIMITED, Beijing (CN)

( * ) Notice: Subject to any disclaimer, the term of this patent is extended or adjusted under 35 U.S.C. 154(b) by 188 days.

This patent is subject to a terminal disclaimer.

(21) Appl. No.: 18/284,502

(22) PCT Filed: Jan. 11, 2022

(86) PCT No.: PCT/CN2022/071214
§ 371 (c)(1),
(2) Date: Sep. 27, 2023

(87) PCT Pub. No.: WO2022/206101
PCT Pub. Date: Oct. 6, 2022

(65) Prior Publication Data
US 2024/0159694 A1 May 16, 2024

(30) Foreign Application Priority Data
Mar. 30, 2021 (CN) .......................... 202110344188.1

(51) Int. Cl.
*G01N 23/083* (2018.01)
*G21F 7/06* (2006.01)

(52) U.S. Cl.
CPC ............. *G01N 23/083* (2013.01); *G21F 7/06* (2013.01); *G01N 2223/1016* (2013.01)

(58) Field of Classification Search
CPC . G01N 23/083; G01N 2223/1016; G21F 7/06
See application file for complete search history.

(56) References Cited

U.S. PATENT DOCUMENTS 5,937,028 A * 8/1999 Tybinkowski ....... G01N 23/046
378/4
7,050,536 B1 * 5/2006 Fenkart .................... G01V 5/22
378/68
(Continued)

FOREIGN PATENT DOCUMENTS

CN 204200046 U 3/2015
CN 106062884 A 10/2016
(Continued)

OTHER PUBLICATIONS

International Search Report and Written Opinion for PCT application No. PCT/CN2022/071215 dated Mar. 29, 2022 (10 pages).
(Continued)

*Primary Examiner* — Blake C Riddick
(74) *Attorney, Agent, or Firm* — Merchant & Gould P.C.

(57) ABSTRACT

A radiographic inspection device and a method of inspecting an object are provided. The radiographic inspection device includes a support frame, where an inspection space applicable to inspect an object is formed within the support frame, and the inspection space has a first opening connecting to an outside; a transfer mechanism applicable to carry the object to move through the inspection space; a shielding curtain mounted at the first opening; and a driving mechanism mounted on the support frame and configured to drive (Continued)

the shielding curtain to move, so as to open or close the first opening. Since the driving mechanism drives the shielding curtain to rise or fall, it is possible to ensure that the lightweight object for inspection may smoothly enter the inspection space for subsequent radiographic scanning.

16 Claims, 10 Drawing Sheets

(56) References Cited

U.S. PATENT DOCUMENTS

| | | | | |
|---|---|---|---|---|
| 10,210,960 | B2 | 2/2019 | Splinter et al. | |
| 11,289,225 | B2 | 3/2022 | Bermuth | |
| 2002/0018542 | A1* | 2/2002 | Fenkart | G01N 23/046 |
| | | | | 378/57 |
| 2005/0166473 | A1* | 8/2005 | Jorg | E04H 1/1277 |
| | | | | 52/64 |
| 2011/0058650 | A1* | 3/2011 | Makino | G01V 5/00 |
| | | | | 378/57 |
| 2016/0372223 | A1 | 12/2016 | Splinter et al. | |
| 2017/0178759 | A1 | 6/2017 | Forsythe et al. | |
| 2019/0064082 | A1* | 2/2019 | Chen | G01V 5/20 |
| 2019/0154869 | A1* | 5/2019 | Gordon | G01N 23/046 |
| 2019/0189300 | A1* | 6/2019 | Rauth | G21F 1/12 |
| 2021/0002078 | A1* | 1/2021 | MacDonald | B65G 15/44 |
| 2021/0151212 | A1 | 5/2021 | Bermuth | |
| 2021/0163231 | A1* | 6/2021 | Connelly | B65G 43/08 |
| 2022/0051826 | A9 | 2/2022 | Bermuth | |
| 2023/0080948 | A1* | 3/2023 | Takayama | G01N 23/083 |
| | | | | 378/57 |

FOREIGN PATENT DOCUMENTS

| | | |
|---|---|---|
| CN | 207420410 U | 5/2018 |
| CN | 209606628 U | 11/2019 |
| CN | 111066093 A | 4/2020 |
| CN | 211698238 U | 10/2020 |
| CN | 212781267 U | 3/2021 |
| JP | H11160487 A | 6/1996 |
| JP | H09127021 A | 5/1997 |

OTHER PUBLICATIONS

English Translation of International Search Report for PCT application No. PCT/CN2022/071215 dated Mar. 29, 2022 (3 pages).
Office Action issued Jul. 28, 2023 for Chinese Patent Application No. 202110344188.1 (10 pages).
Examination Report issued Feb. 26, 2025 for GB Application No. 2316439.5 (2 pges).

* cited by examiner

RADIOGRAPHIC INSPECTION DEVICE AND METHOD OF INSPECTING OBJECT

CROSS-REFERENCE TO RELATED APPLICATION(S)

This application is a National Stage Application of International Application No. PCT/CN2022/071214, filed on Jan. 11, 2022, which claims priority to Chinese Patent Application No. 202110344188.1 filed on Mar. 30, 2021, and which applications are incorporated herein by reference. To the extent appropriate, a claim of priority is made to each of the above disclosed applications.

TECHNICAL FIELD

Embodiments of the present disclosure relate to a radiographic inspection device, and in particular to a radiographic inspection device applicable to inspect an object carried on a transfer apparatus, and a method of inspecting an object using the radiographic inspection device.

BACKGROUND

In a field of non-invasive inspection of objects such as luggage or packages, an X-ray inspection device is often used to inspect objects for a presence of prohibited items such as drugs and explosives. The object to be inspected usually pass through an inspection space of the X-ray inspection device by means of a conveyor structure, and a radiographic emission apparatus emits X-rays into the inspection space to realize an inspection of the object. Generally, in existing radiographic inspection devices, shielding curtains, such as lead materials, are mounted at an entrance and an exit of the inspection space, so as to shield the X-rays inside the radiographic inspection device, thereby preventing X-rays from leaking.

Shielding curtains in current practical applications are all distributed fixed suspensions. To ensure an effectiveness of shielding X-rays, a low end of the shielding curtain is in contact with a conveyor belt moving in a transfer mechanism. During an inspection process, an object to be inspected enters an inspection region of the inspection space through a power of the conveyor belt to push open the shielding curtain at the entrance. After the inspection is completed and the object passes through the inspection space, it is required to push open the shielding curtain at the exit again through a dragging of the conveyor belt to move away from the inspection space, so that the object moves away from the radiographic inspection device.

In the existing radiographic inspection device, the shielding curtain mounted at the exit and the shielding curtain mounted at the entrance are fixed on a support frame of the radiographic inspection device. Due to a relatively heavy nature of the shielding curtain, it is impossible to push open the shielding curtain to enter the inspection region for a lighter-weight object to be inspected. On the contrary, when the shielding curtain is pushed open by the object too early, a leaking of X-ray may be inevitably caused.

In another type of radiographic inspection device, multiple shielding curtains are distributed in the inspection space. In this way, no matter at the entrance or the exit, when one shielding curtain is pushed open, other shielding curtains are remained closed, thereby ensuring to prevent X-rays from leaking. However, in this type of radiographic inspection device, it is required to have a certain length of inspection space to meet requirements of shielding X-rays, so that a longer inspection space is required and a larger space is occupied.

SUMMARY

The purpose of the present disclosure is to solve at least one aspect of the above problems and defects in the existing technologies.

According to an embodiment of an aspect of the present disclosure, a radiographic inspection device is provided, including a support frame, where an inspection space applicable to inspect an object is formed within the support frame, and the inspection space has a first opening connected to an outside; a transfer mechanism applicable to carry the object to move through the inspection space; a shielding curtain mounted at the first opening; and a driving mechanism mounted on the support frame and constructed to drive the shielding curtain to move, so as to open or close the opening.

According to an embodiment of the present disclosure, the driving mechanism includes: a driver mounted on the support frame; and a transmission mechanism. The driver drives the shielding curtain to rise or fall through the transmission mechanism.

According to an embodiment of the present disclosure, the driver includes a motor. The transmission mechanism includes: a first roller mounted on an upper part of the support frame and driven to rotate by the motor; a second roller mounted on the support frame and located below the first roller; a conveyor belt wrapped around the first roller and the second roller; and a joint portion. The shielding curtain is connected to the conveyor belt through the joint portion, so that the shielding curtain is driven to move up and down with the conveyor belt.

According to an embodiment of the present disclosure, the joint portion includes: a main body portion connected to the conveyor belt; and a pair of clamping elements. The pair of clamping elements grip an upper end of the shielding curtain and are connected to the main body portion.

According to an embodiment of the present disclosure, the main body portion has an approximate shape of isosceles triangle or isosceles trapezoid, and is connected to an approximate middle part of the pair of clamping elements.

According to an embodiment of the present disclosure, the transmission mechanism further includes a first guide mechanism. The first guide mechanism is applicable to guide the joint portion to move up and down.

According to an embodiment of the present disclosure, the first guide mechanism includes: a guide rail mounted on the support frame; and a guide block mounted on the joint portion.

According to an embodiment of the present disclosure, the transmission mechanism further includes a counterweight. The counterweight is connected on the other side of the conveyor belt opposite to one side connecting to the joint portion, so as to balance a weight of the joint portion and a weight of the shielding curtain.

According to an embodiment of the present disclosure, the transmission mechanism further includes a second guide mechanism. The second guide mechanism is applicable to guide the counterweight to move up and down.

According to an embodiment of the present disclosure, the transmission mechanism further includes a limiting apparatus. The limiting apparatus is applicable to limit a range of movement of the joint portion in an up and down direction.

According to an embodiment of the present disclosure, the limiting apparatus includes: a first proximity switch mounted on the support frame; and a matching switch mounted on the joint portion. The driving mechanism stops driving the shielding curtain to rise in response to the matching switch being close to the first proximity switch.

According to an embodiment of the present disclosure, the limiting apparatus includes a second proximity switch mounted on the support frame. The driving mechanism stops driving the shielding curtain to fall in response to the matching switch being close to the second proximity switch.

According to an embodiment of the present disclosure, the radiographic inspection device further includes a first detection apparatus. The driving mechanism drives the shielding curtain to rise, in response to the first detection apparatus detecting that the object carried on the transfer mechanism is located on an outer side of the support frame and is getting close to the shielding curtain, so as to allow the object on the transfer mechanism to move into the inspection space.

According to an embodiment of the present disclosure, the radiographic inspection device further includes a second detection apparatus. The driving mechanism drives the shielding curtain to fall to an initial position, in response to the second detection apparatus detecting that the object carried on the transfer mechanism moves in the support frame away from the shielding curtain.

According to an embodiment of the present disclosure, the radiographic inspection device further includes a third detection apparatus. The transfer mechanism rotates in a reversing direction to drive the object to move towards the first opening, in response to the third detection apparatus detecting the object carried on the transfer mechanism.

According to an embodiment of the present disclosure, the driving mechanism drives the shielding curtain to rise, in response to the transfer mechanism rotating in the reversing direction and the second detection apparatus detecting that the object carried on the transfer mechanism is in the support frame and is getting close to the shielding curtain, so as to allow the object on the transfer mechanism to move outside the inspection space.

According to an embodiment of the present disclosure, the radiographic inspection device further includes: an auxiliary shielding curtain mounted at a second opening of the inspection space connecting to the outside; and an auxiliary driving mechanism mounted on the support frame and configured to drive the auxiliary shielding curtain to move, so as to open or close the second opening.

According to an embodiment of the present disclosure, the radiographic inspection device further includes an auxiliary detection apparatus. The auxiliary driving mechanism drives the auxiliary shielding curtain to rise, in response to the auxiliary detection apparatus detecting that the object carried on the transfer mechanism is located in the support frame and is getting close to the auxiliary shielding curtain, so as to allow the object on the transfer mechanism to move outside the inspection space.

According to an embodiment of the present disclosure, the radiographic inspection device further includes a fourth detection apparatus. The driving mechanism drives the auxiliary shielding curtain to fall to an initial position, in response to the fourth detection apparatus detecting that the object carried on the transfer mechanism moves outside the support frame away from the auxiliary shielding curtain.

According to an embodiment of the present disclosure, the first detection apparatus, the second detection apparatus, the third detection apparatus, the auxiliary detection apparatus and the fourth detection apparatus include: light emitting components and light receiving components respectively mounted on two sides of the support frame and perpendicular to a movement direction of the object, and the light receiving components are applicable to receive lights emitted by the light emitting components.

According to an embodiment of the present disclosure, the shielding curtain includes a stacked multilayer material. One layer of the stacked multilayer material is made of a material containing lead.

According to another embodiment of the present disclosure, a method of inspecting an object using the aforementioned radiographic inspection device is provided, including:
 placing the object to be inspected on the transfer mechanism;
 driving the shielding curtain to rise by the driving mechanism when the object to be inspected moves close to the first opening, so as to allow the object to move into the inspection space;
 driving the shielding curtain to fall to an initial position by the driving mechanism when the object on the transfer mechanism moves in the support frame away from the shielding curtain;
 performing a radioactive inspection on the object moving within the inspection space;
 driving the inspected object to move towards the first opening by the transfer mechanism; and
 driving the shielding curtain to rise by the driving mechanism when the inspected object moves close to the first opening so as to allow the object to move outside the inspection space.

According to an embodiment of the present disclosure, the method further includes:
 driving the shielding curtain to fall to the initial position by the driving mechanism when the inspected object outside the support frame moves away from the shielding curtain.

According to another embodiment of the present disclosure, a method of inspecting an object using the aforementioned radiographic inspection device is provided, including:
 placing the object to be inspected on the transfer mechanism;
 driving the shielding curtain to rise by the driving mechanism when the object to be inspected moves close to the first opening, so as to allow the object on the transfer mechanism to move into the inspection space;
 driving the shielding curtain to fall to an initial position by the driving mechanism when the object on the transfer mechanism moves in the support frame away from the shielding curtain;
 performing a radioactive inspection on the object moving within the inspection space; and
 driving the auxiliary shielding curtain to rise by the auxiliary driving mechanism when the inspected object within the inspection space moves close to the second opening, so as to allow the object to move outside the inspection space.

According to an embodiment of the present disclosure, the method further includes:
 driving the auxiliary shielding curtain to fall to an initial position by the second driving mechanism when the object outside the support frame moves away from the auxiliary shielding curtain.

DETAILED DESCRIPTION OF EMBODIMENTS

Figure 1:
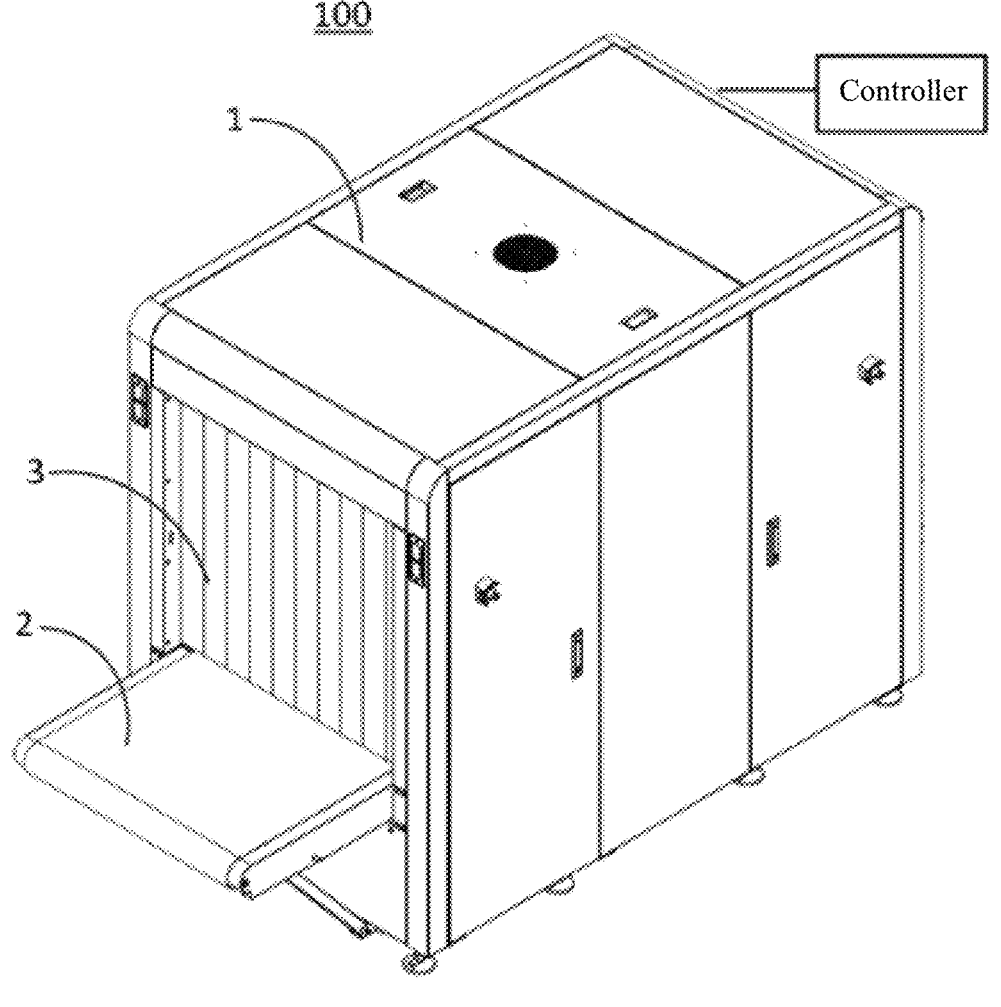
FIG. 1 shows a three-dimensional schematic diagram of a radiographic inspection device according to an exemplary embodiment of the present disclosure.

With reference to accompanying drawings in embodiments of the present disclosure, the technical solution in the embodiments of the present disclosure will be described clearly and completely. Apparently, the embodiments described are only some embodiments of the present disclosure, rather than all embodiments. The description of at least one exemplary embodiment below is actually only explanatory, and it will never be used as any limitation on the present disclosure and its application or use. Based on embodiments in the present disclosure, all other embodiments derived by those of ordinary skill in the art without creative labor, fall within the scope of protection of the present disclosure.

In the following detailed descriptions, for purposes of explanation, many specific details are elaborated to provide a comprehensive understanding of embodiments of the present disclosure. However, it is clear that one or more embodiments may be implemented without these specific details. In other cases, well-known structures and devices are illustrated to simplify the accompanying drawings. It may not be discussed in details about technologies, methods and devices known by those of ordinary skill in the art in related fields, but in an appropriate case, the technologies, methods and devices should be regarded as a part of granted description.

In the description of the present disclosure, it should be understood that an orientation or position relationship indicated by words such as "front, back, up, down, left, right", "lateral, longitudinal, vertical, horizontal" and "top, bottom" and other positions, is just to facilitate the description of the present disclosure and simplify the description, based on the orientation or position relationship shown in the figures. Without an opposite explanation, these orientation words do not indicate and suggest devices or components referred to that must have a specific orientation or construction or operate in a specific orientation, so it should not be understood as a limitation on the scope of protection of the present disclosure. The orientation word "inner or outside" refers to an inside or an outside of a contour of each component itself.

In the description of the present disclosure, it should be understood that it is just to facilitate differences in corresponding parts, by using words "first" and "second" to define parts. If there is no other statements, the above words have no special meaning, which should not be understood as a limitation on the scope of protection of the present disclosure.

According to a general concept of an invention of the present disclosure, a radiographic inspection device is provided, including a support frame, where an inspection space applicable to inspect an object is formed within the support frame, and the inspection space has a first entrance connecting to an outside; a transfer mechanism applicable to carry the object to move through the inspection space; a shielding curtain mounted at the first opening; and a driving mechanism mounted on the support frame and configured to drive the shielding curtain to move, so as to open or close the opening.

Figure 2:
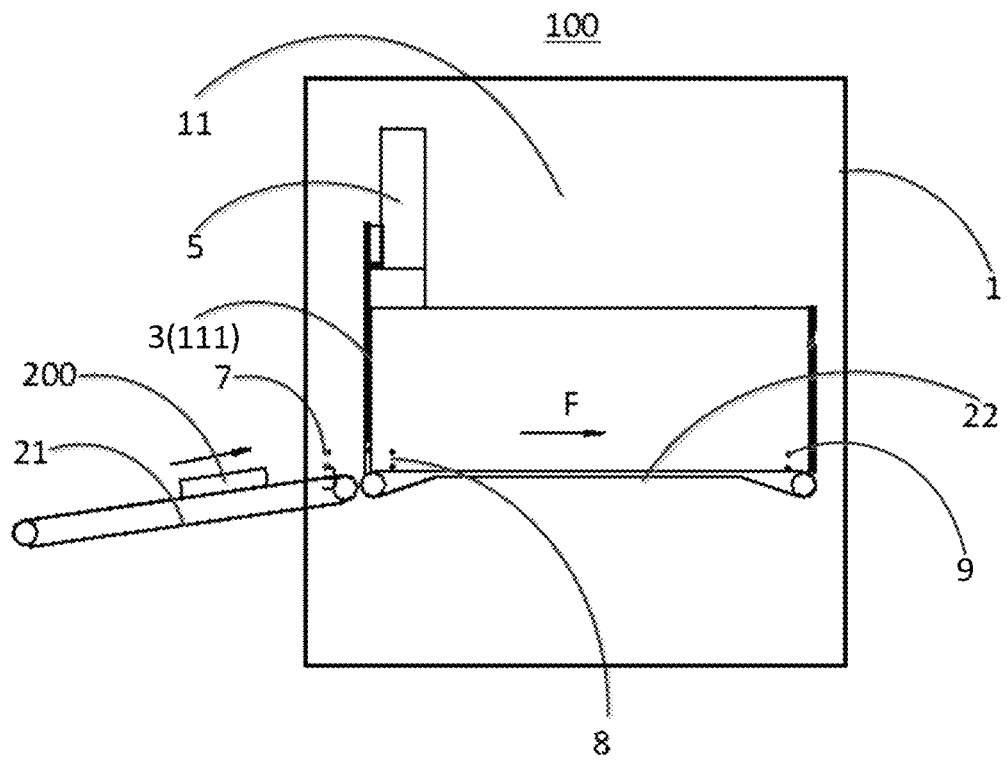
FIG. 2 shows a simplified schematic diagram of a process of inspecting an object by the radiographic inspection device shown in FIG. 1.

FIG. 1 shows a three-dimensional schematic diagram of a radiographic inspection device according to an exemplary embodiment of the present disclosure; FIG. 2 shows a simplified schematic diagram of a process of inspecting an object by the radiographic inspection device shown in FIG. 1.

In an exemplary embodiment, with reference to FIGS. 1 to 2, the radiographic inspection device 100 is applicable to inspect whether a prohibited item such as a drug and an explosive exists in an object 200 such as suitcases, packages, handbags or not, at places with high turnover of rate such as stations, airports, stadiums or shopping malls. The radiographic inspection device 100 includes: a support frame 1, a transfer mechanism 2, a shielding curtain 3 and a driving mechanism 5. An inspection space 11 applicable to inspect the object 200 is formed within the support frame 1. The inspection space 11 has a first opening 111 connecting to an outside. The support frame 1 is equipped with a housing made of shielding material to prevent radiation from leaking. The transfer mechanism 2 is applicable to carry the object 200 to move through the inspection space 11. An X-ray emitting and receiving apparatus such as a CT machine is mounted on the support frame to perform X-ray scanning on the object 200 transferred from the transfer mechanism 2 to the inspection space 11. The shielding curtain 3 is mounted at the first opening 111 of the inspection space 11. The driving mechanism 5 is mounted on the support frame 1, for example on a top wall frame 14 of the support frame 1, and is configured to drive the shielding curtain 3 to move, so as to open or close the first opening 111. The radiographic inspection device 100 also includes a controller applicable to receive electrical signals from various sensors and control operations of related devices (such as CT machines, driving mechanisms, etc.) of the radiographic inspection device.

The support frame 1 may include a plurality of upright frames 13 located on two sides of the support frame 1 and a plurality of top frames 14 located on an upper part of the upright frame 13. The upright frame 13 is mounted on the base 15. The transfer mechanism 2 includes an input transfer mechanism 21 mounted outside the first opening 111 of the support frame 1, and an internal transfer mechanism 22 located in the inspection space 11. Each of the input transfer mechanism 21 and the internal transfer mechanism 22 may include a rubber belt machine for cyclic rotation. The object 200 to be inspected is placed on the input transfer mechanism 21 and transferred from the input transfer mechanism 21 to the internal transfer mechanism 22. After being inspected in the inspection space 11, the object is transported by the internal transfer mechanism 22 to the input transfer mechanism 21, which is implemented as an output portion, to complete a process of scanning the object 200. That is to say, the object 200 in the transfer mechanism 2 enters the inspection space 11 through the first opening 111, and moves to an outside of the inspection space 11 after being scanned.

In this way, in the radiographic inspection device of the embodiments of the present disclosure, before the object 200 to be inspected passes the first opening 111, the shielding curtain 3 may be automatically lifted, so as to allow the object 200 to smoothly pass through the first opening 111. After the object passes through the first opening 111, the driving mechanism 5 will drive the shielding curtain 3 to fall, so as to prevent X-rays in the inspection space from leaking outside, which causes radiation pollution to surrounding environments.

Figure 3:
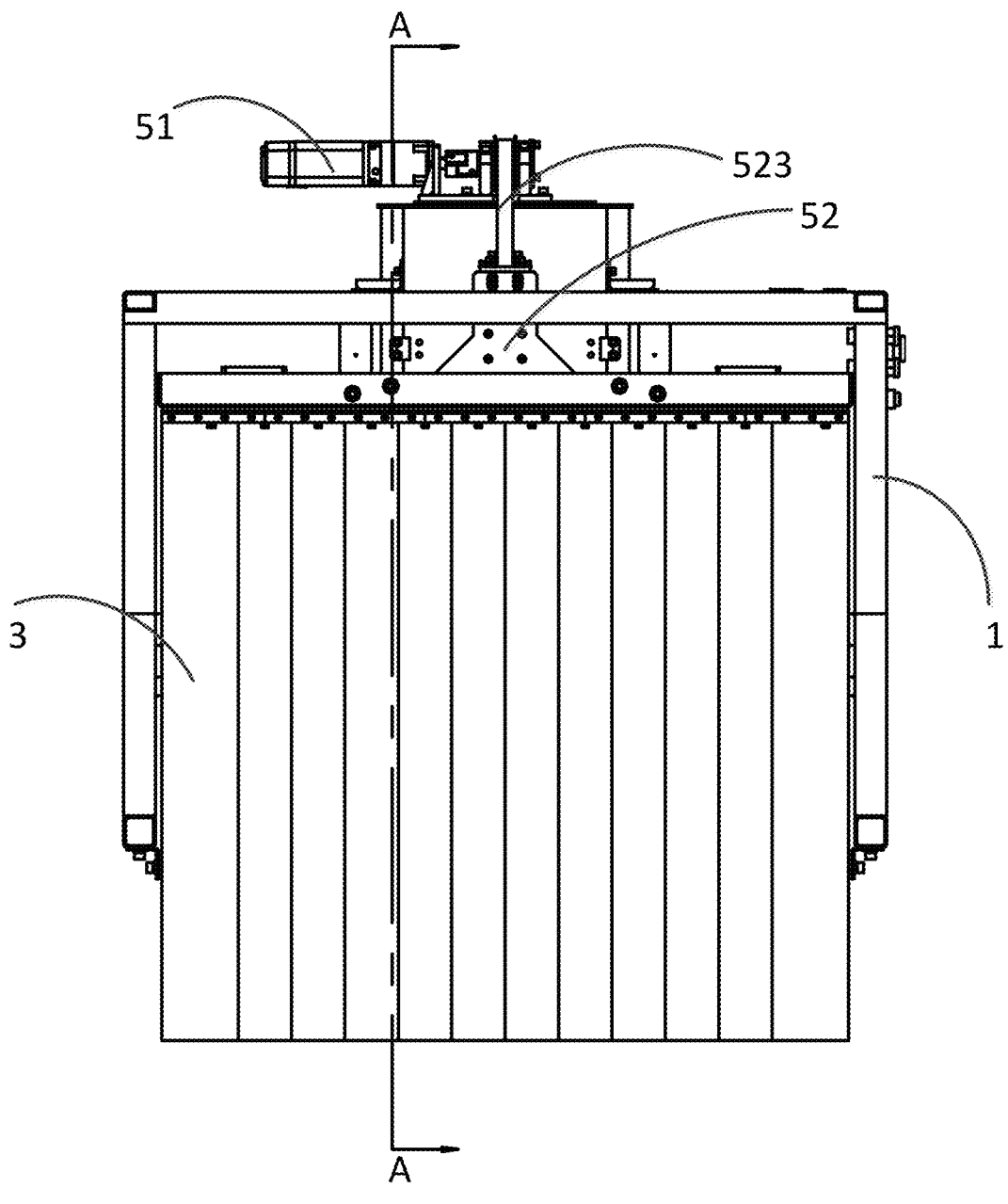
FIG. 3 shows a partial elevation view of the radiographic inspection device shown in FIG. 2.
Figure 4:
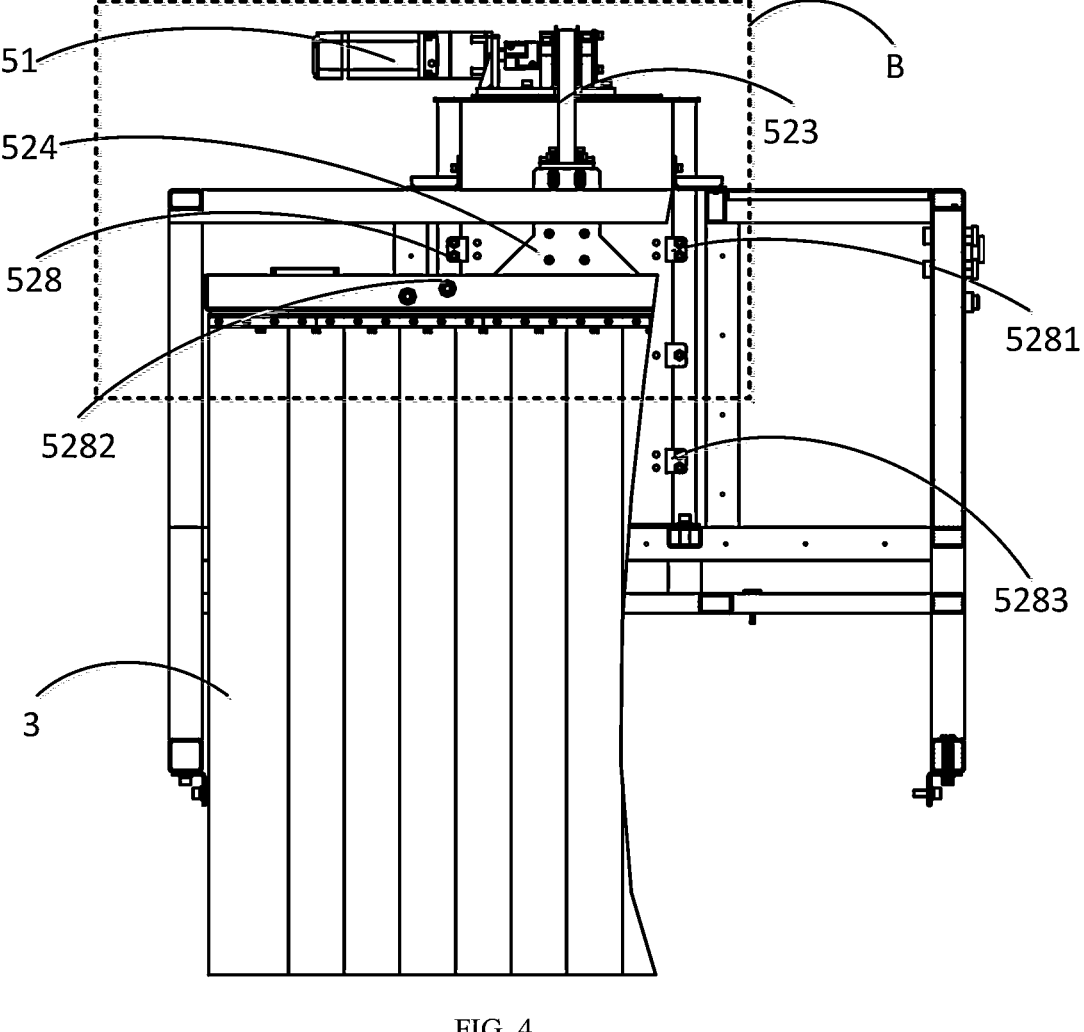
FIG. 4 shows a partial elevation view of the radiographic inspection device shown in FIG. 2, where a part of a shielding curtain is not shown in the figure.
Figure 5:
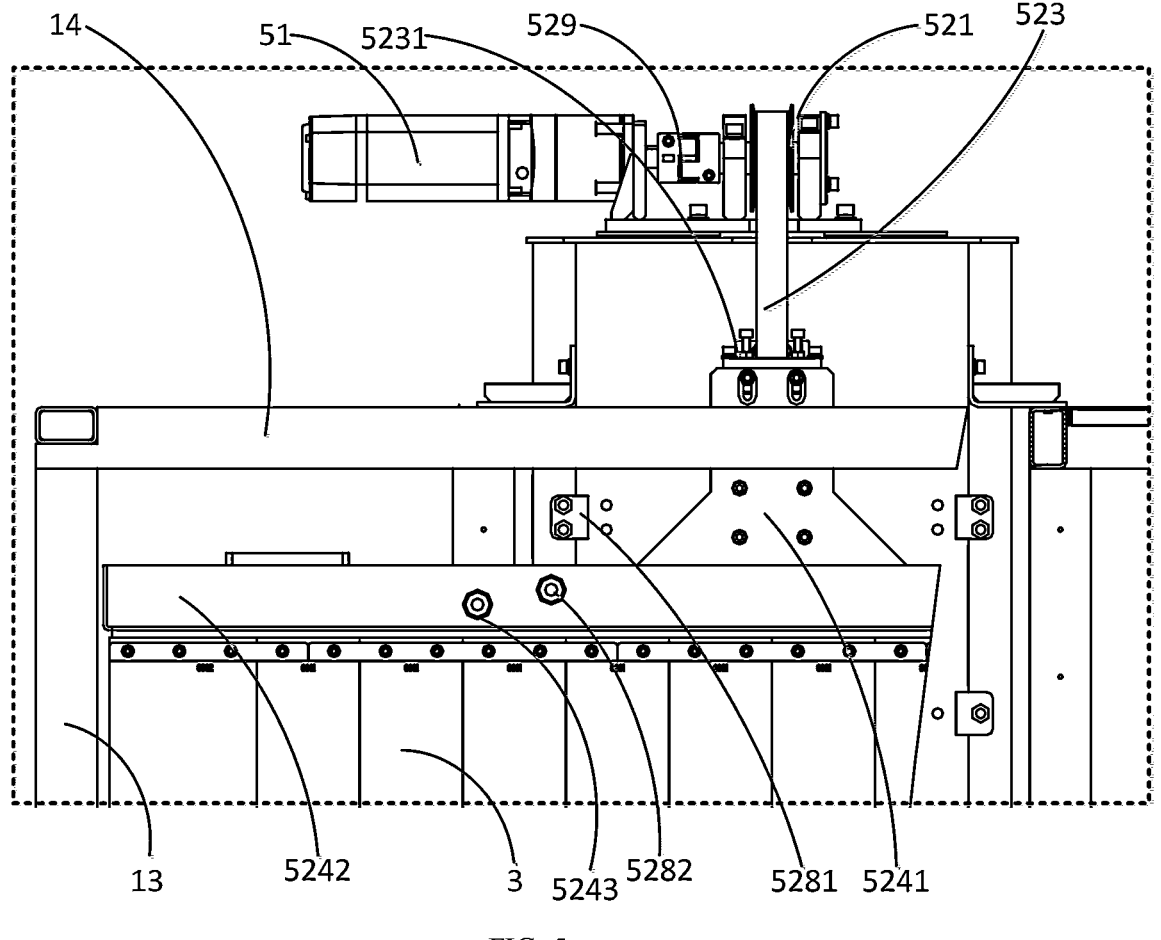
FIG. 5 shows an enlarged schematic diagram of part B shown in FIG. 4.
Figure 6:
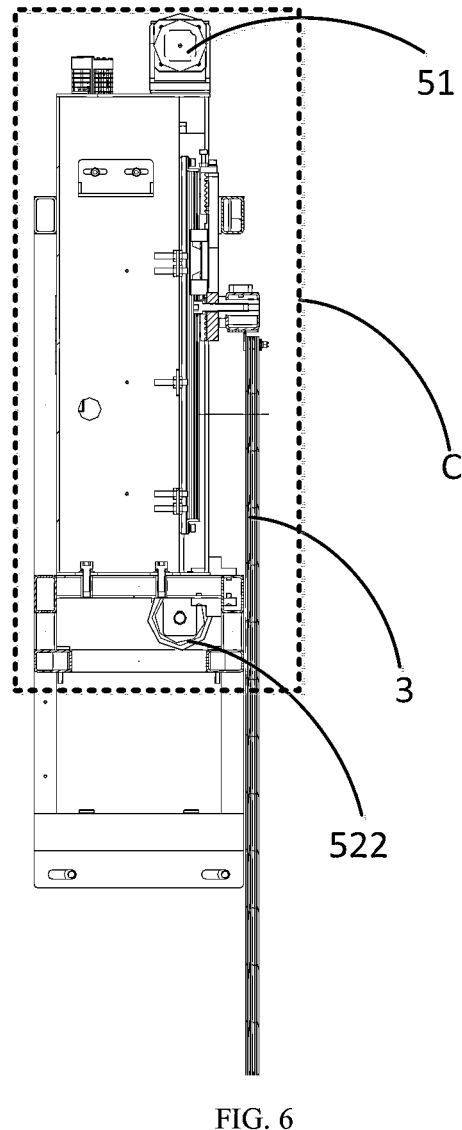
FIG. 6 shows a cross-sectional view along line A-A shown in FIG. 3.
Figure 7:
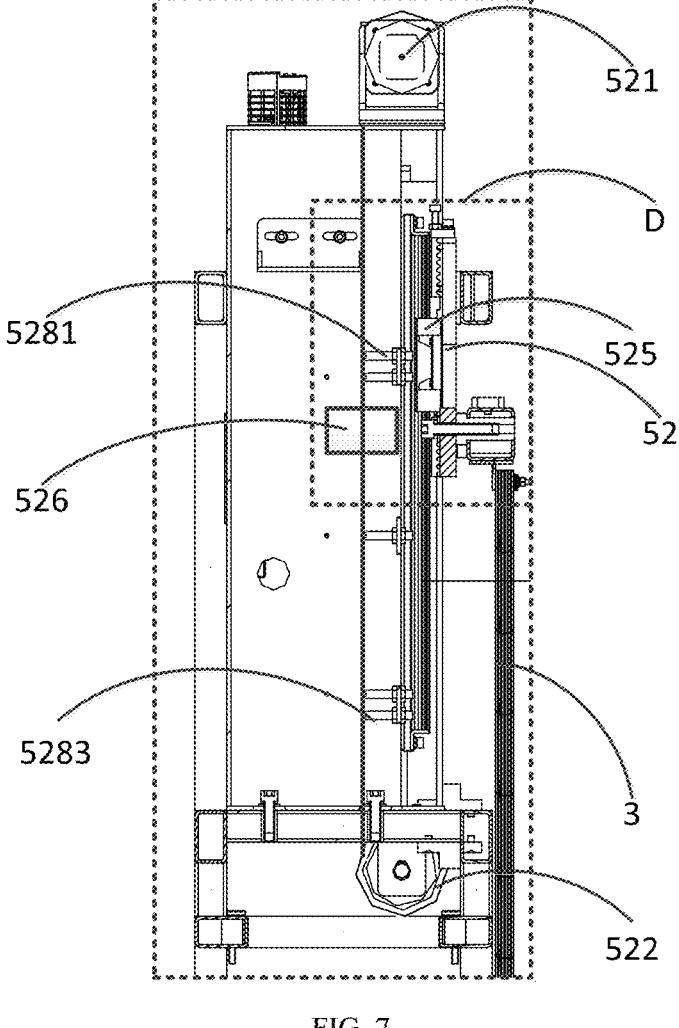
FIG. 7 shows an enlarged schematic diagram of part C shown in FIG. 6.
Figure 8:
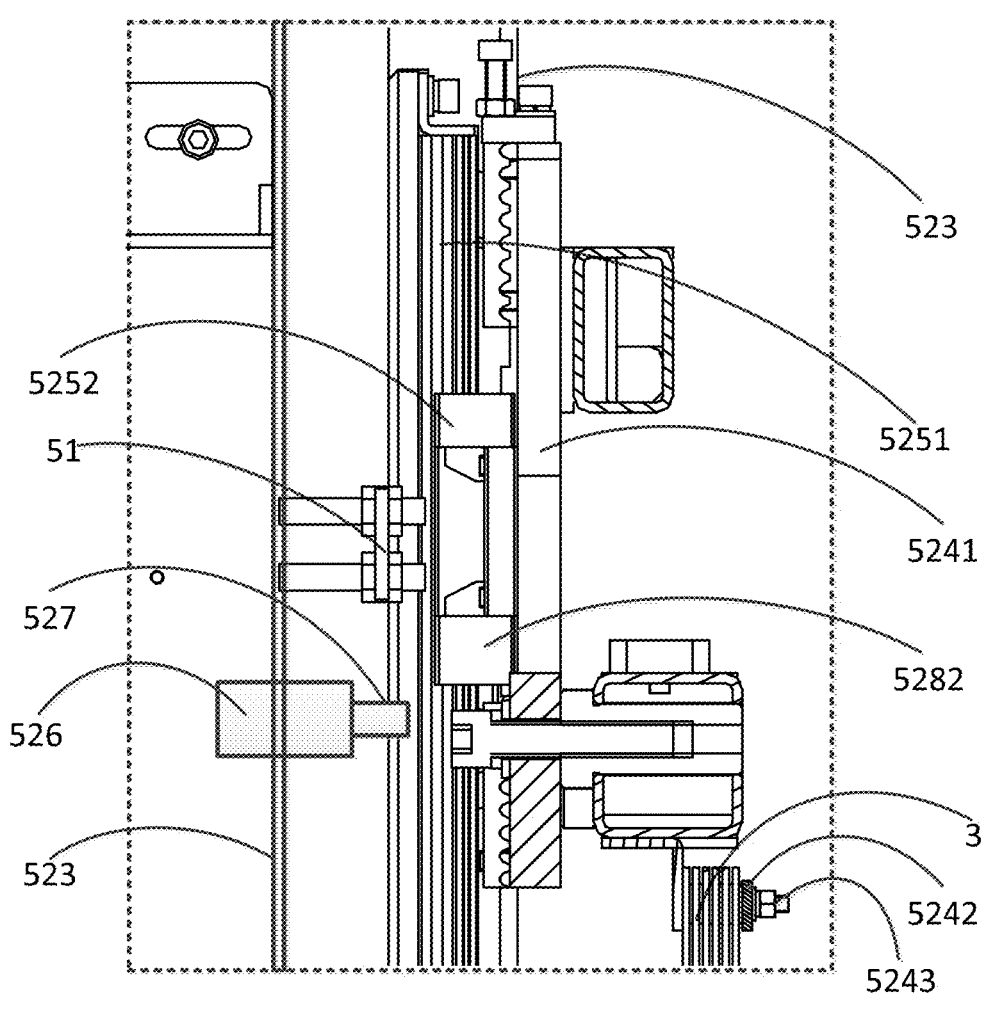
FIG. 8 shows an enlarged schematic diagram of part D shown in FIG. 7.

FIG. 3 shows a partial elevation view of the radiographic inspection device shown in FIG. 2. FIG. 4 shows a partial elevation view of the radiographic inspection device shown in FIG. 2, where a part of a shielding curtain is not shown in the figure. FIG. 5 shows an enlarged schematic diagram of part B shown in FIG. 4. FIG. 6 shows a side view of a driving mechanism and a shielding curtain of a radiographic inspection device according to an exemplary embodiment of the present disclosure. FIG. 7 shows an enlarged schematic diagram of part C shown in FIG. 6. FIG. 8 shows an enlarged schematic diagram of part D shown in FIG. 7.

In an exemplary embodiment, with reference to FIGS. 1 to 8, the driving mechanism includes: a driver 51 mounted on the support frame 1; and a transmission mechanism 52. The driver 51 drives the shielding curtain 3 to rise or fall through the transmission mechanism 52, so as to open or close the first opening.

In an exemplary embodiment, with reference to FIGS. 1 to 8, the driver 51 includes a motor applicable to drive the transmission mechanism 52. The transmission mechanism includes a first roller 521 mounted on an upper part of the support frame 1 and driven to rotate by the motor through a coupling 529; a second roller 522 mounted on the support frame 1 and located below the first roller 521; a conveyor belt 523 wrapped around the first roller 521 and the second roller 522; and a joint portion 524. The shielding curtain 3 is connected to the conveyor belt 523 through the joint portion 524, so that the shielding curtain 3 is driven to move up and down with the conveyor belt 523.

In an exemplary embodiment, with reference to FIGS. 3 to 8, the joint portion 524 includes a main body portion 5241 connected to the conveyor belt 523; and a pair of clamping elements 5242, where the pair of clamping elements use bolts 5243 to grip an upper end of the shielding curtain and are connected to the main body portion 5241. In this way, the driver 51 drives the first roller 521 to rotate, so as to further drive the conveyor belt 523 to move up and down, thereby driving the entire shielding curtain to move up and down.

Although an embodiment of the transmission mechanism including the first roller, the second roller and the conveyor belt are described above, the present disclosure is not limited to this. In an alternative embodiment, the transmission mechanism may include a turbine driven by a motor and a worm which matches with the turbine. The joint portion is mounted on the worm. In this way, the motor drives the turbine to rotate, and through a meshing between the turbine and the worm, a rotation of the motor is converted into a linear movement of the worm, thereby causing the worm to drive the shielding curtain to rise and fall. In another alternative embodiment, a piston rod of a pneumatic cylinder or a hydraulic cylinder may be used to drive the joint portion to reciprocate straight up and down, thereby driving the shielding curtain to rise and fall.

In an exemplary embodiment, the main body portion 5241 has an approximate shape of isosceles triangle or isosceles trapezoid. A narrower upper part of the main body portion is connected to the conveyor belt 523 through an elastic bolt mechanism 5231. A wider lower part of the main body portion is connected to an approximate middle part of the pair of clamping elements 5242. In this way, the conveyor belt 523 is used to drive the shielding curtain 3 to move, and the shielding curtain 3 may be maintained to move up and down in a stable posture.

In an exemplary embodiment, the transmission mechanism 52 also includes a first guide mechanism 525, where the first guide mechanism is applicable to guide the joint portion 524 to move up and down. In an exemplary embodiment, the first guide mechanism 525 includes: a guide rail 5251 mounted on the support frame 1; and a guide block 5252 mounted on the joint portion 524. For example, a guide groove extending in the up and down direction may be formed on the guide rail 5251, and a part of the guide block 5252 may be inserted into the guide groove. In this way, the joint portion 524 and the shielding curtain 3 may move in a straight line in the up and down direction, so as to prevent the shielding curtain 3 from twisting. In an alternative embodiment, the first guide mechanism includes a guide groove formed in an inner side of a pair of upright frames 13 of the support frame 1 and extending up and down. Two ends of the clamping elements 5242 are inserted into the guide groove, so as to guide a lifting operation and a falling operation of the shielding curtain.

In an exemplary embodiment, the transmission mechanism 52 also includes a counterweight 526. A weight of the counterweight 526 depends on a total weight of the joint portion 4 and the shielding curtain 3. The counterweight 526 is connected to the other side of the conveyor belt 523 opposite to one side connecting to the joint portion 524, so as to balance a weight of the joint portion 524 and a weight of the shielding curtain 3. By disposing the counterweight 526, a force driving a movement of the shielding curtain may be reduced, thereby reducing a power of the driver.

In an exemplary embodiment, the transmission mechanism 52 also includes a second guide mechanism 527, where the second guide mechanism 527 is applicable to guide the counterweight 526 to move up and down. In an exemplary embodiment, the second guide mechanism 527 includes: a guide rail mounted on the support frame 1; and a guide block mounted on the counterweight 526. In this way, the counterweight 526 may move in a straight line in the up and down direction.

In an exemplary embodiment, with reference to FIGS. 3 to 8, the radiographic inspection device 100 also includes a limiting apparatus 528. The limiting apparatus 528 is applicable to limit a range of movement of the joint portion 524 in an up and down direction, thereby limiting a lifting (falling) range of the shielding curtain. Specifically, the limiting apparatus 528 includes: a first proximity switch 5281 mounted on the support frame 1; and a matching switch 5282 mounted on the joint portion 524. The driving mechanism 5 stops driving the shielding curtain 3 to rise in response to the matching switch 5282 being close to the first proximity switch 5281. Furthermore, the limiting apparatus 528 also includes a second proximity switch 5283 mounted on the support frame 1. The driving mechanism 5 stops driving the shielding curtain 3 to fall in response to the matching switch 5282 being close to the second proximity switch 5283. That is to say, when the matching switch 5282 is close to the first proximity switch 5281, the shielding curtain 3 is stopped rising. When the matching switch 5282 is close to the second proximity switch 5283, the shielding curtain 3 is stopped falling. In this way, the range of movement of the upper end of the shielding curtain 3 is limited to a distance between the first proximity switch 5281 and the second proximity switch 5283. That is to say, a maximum lifting (falling) range of the shielding curtain 3 is the distance between the first proximity switch 5281 and the second proximity switch 5283. In an exemplary embodiment, the first proximity switch 5281 and the second proximity switch 5283 are electromagnetically coupled with the matching switch 5282 through an inductive induction. For example, each of the first proximity switch 5281 and the second proximity switch 5283 includes a transmitting coil. The matching switch 5282 includes a receiving coil electromagnetically coupled with the transmitting coil. In an alternative embodiment, the first proximity switch 5281 and the second proximity switch 5283 are electrically connected to the matching switch 5282 through an electrical contact manner.

In an exemplary embodiment, with reference to FIGS. 1 to 2, the radiographic inspection device 100 also includes a first detection apparatus 7. The driving mechanism 5 drives the shielding curtain 3 to rise, in response to the first detection apparatus 7 detecting that the object 200 carried on an input transfer mechanism 21 of the transfer mechanism 2 is located on an outer side of the support frame 1 and is getting close to the shielding curtain 3 located at the first opening 111 in a movement direction F. The shielding curtain is in an open state, so as to allow the object 200 on the transfer mechanism 2 to move into the inspection space 11.

In an exemplary embodiment, with reference to FIGS. 1 to 2, the radiographic inspection device 100 also includes a second detection apparatus 8. The driving mechanism 5 drives the shielding curtain 3 to fall to an initial position, in response to the second detection apparatus 8 detecting that the object 200 carried on an internal transfer mechanism 22 of the transfer mechanism 2 moves in the support frame 1 away from the shielding curtain 3 located at the first opening 111. The shielding curtain is in a closed state, so as to prevent radiation from leaking.

In an exemplary embodiment, with reference to FIGS. 1 to 2, the radiographic inspection device 100 also includes a third detection apparatus 9. The transfer mechanism 2 drives the object 200 to move towards the first opening 111 in a reversing direction relative to the movement direction F, in response to the third detection apparatus 9 detecting the inspected object 200 carried on the internal transfer mechanism 22 of the transfer mechanism 2.

In an exemplary embodiment, with reference to FIGS. 1 to 2, the driving mechanism 5 drives the shielding curtain 3 to rise, in response to the transfer mechanism 2 rotating in the reversing direction and the second detection apparatus 8 detecting that the inspected object 200 carried on the transfer mechanism 2 is in the support frame 1 and is getting close to the shielding curtain 3, so as to allow the object 200 on the transfer mechanism 2 to move outside the inspection space 11.

According to another embodiment of the present disclosure, a method of inspecting an object 200 using the radiographic inspection device 100 described in any of the above embodiments is provided, with reference to FIGS. 1 to 2, including the following steps.

An object 200 to be inspected is placed on an input transfer mechanism 21 of the transfer mechanism, so that the transfer mechanism drives the object 200 to move in a movement direction F.

When the object 200 to be inspected moves close to the first opening 111, the shielding curtain 3 is driven to rise by the driving mechanism 5, so as to allow the object 200 on the input transfer mechanism 21 of the transfer mechanism 2 to move along the movement direction F to an internal transfer mechanism 22 in the inspection space 11.

When the object 200 on the internal transfer mechanism 22 of the transfer mechanism 2 moves in the support frame 1 away from the shielding curtain 3, the shielding curtain 3 is driven to fall to an initial position by the driving mechanism 5, and the initial position is a position where a lower end of the shielding curtain 3 is in contact with the transfer mechanism 2.

A radioactive inspection is performed on the object moving on the internal transfer mechanism of the transfer mechanism 2 within the inspection space.

The transfer mechanism 2 rotates in a reversing direction relative to the movement direction to drive the inspected object 200 to move towards the first opening 111.

When the inspected object 200 moves close to the first opening 111, the shielding curtain 3 is driven to rise by the driving mechanism 5, so as to allow the object 200 to move outside the inspection space 11.

Furthermore, in a case that the transfer mechanism rotates in the reversing direction of the movement direction, when the inspected object 200 moves outside the support frame 1 away from the shielding curtain 3, the shielding curtain 3 is driven to fall to the initial position by the driving mechanism.

Figure 9:
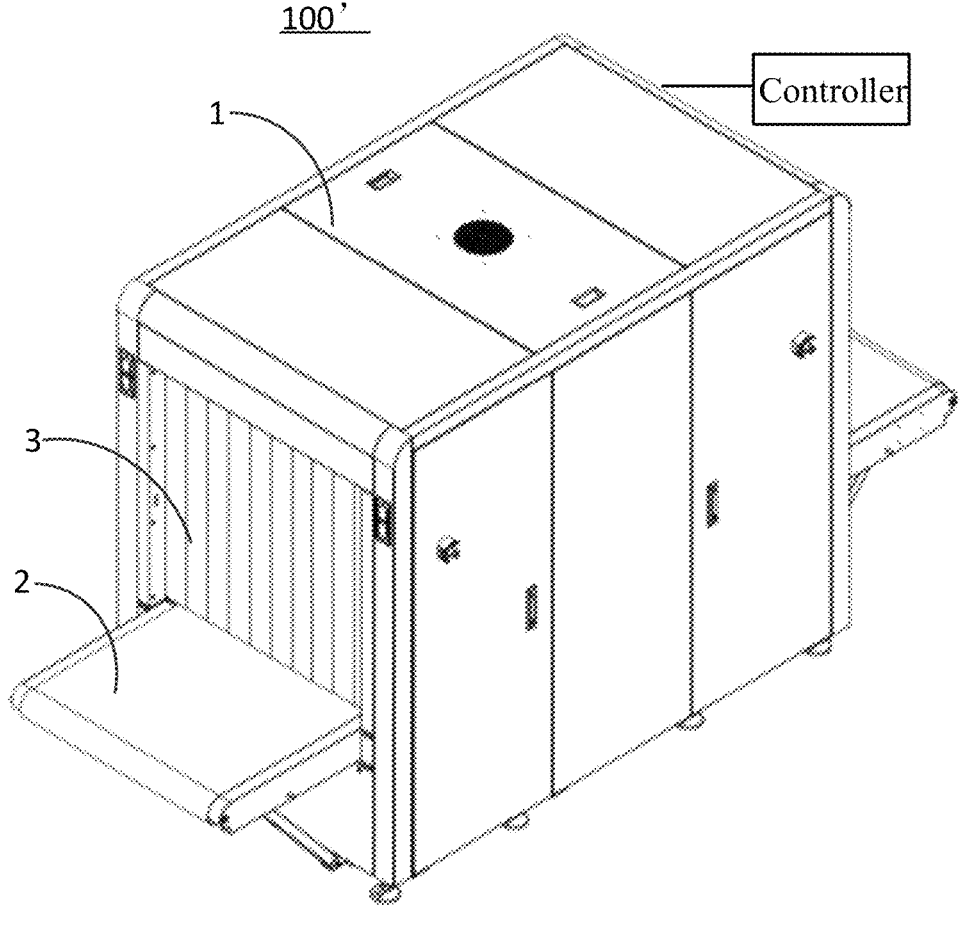
FIG. 9 shows a three-dimensional schematic diagram of a radiographic inspection device according to another exemplary embodiment of the present disclosure.
Figure 10:
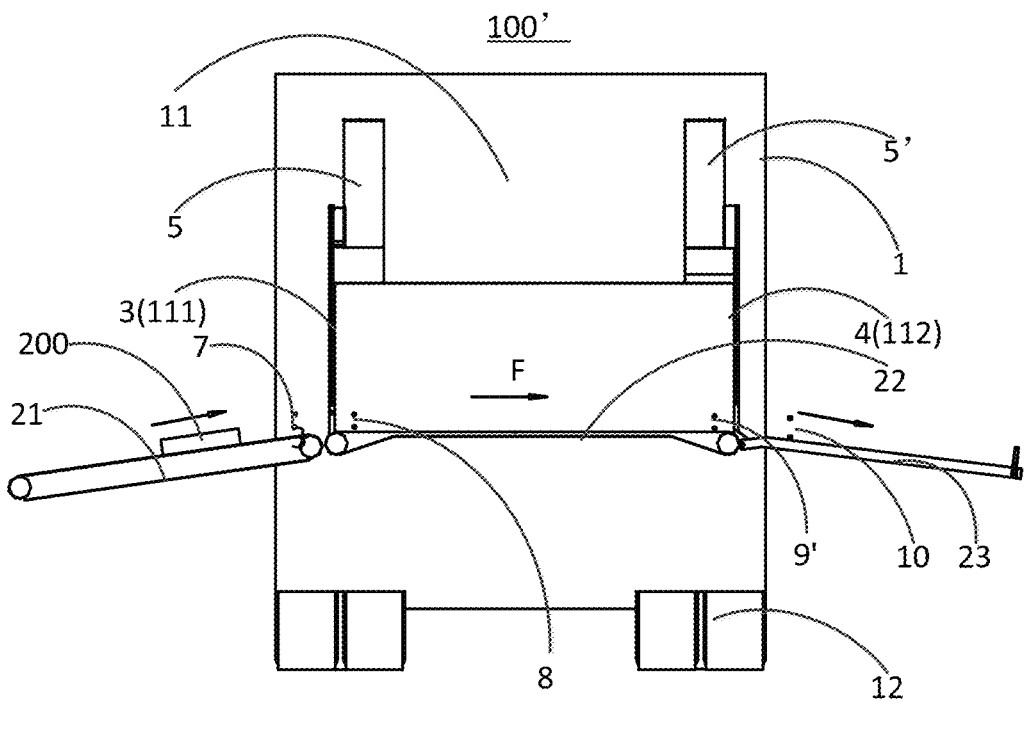
FIG. 10 shows a simplified schematic diagram of a process of inspecting an object by the radiographic inspection device shown in FIG. 9.

FIG. 9 shows a three-dimensional schematic diagram of a radiographic inspection device according to another exemplary embodiment of the present disclosure. FIG. 10 shows a simplified schematic diagram of a process of inspecting an object by the radiographic inspection device shown in FIG. 9.

It may be understood that in the radiographic inspection device 100 shown in FIGS. 1 and 2, the first opening 111 is implemented as an entrance for the object 200 to enter the inspection space 11 and an exit for the object 200 to move away from the inspection space 11 after the inspection is completed.

A difference between the radiographic inspection device 100' of the embodiments shown in FIGS. 9 and 10 and the radiographic inspection device 100 shown in FIGS. 1 and 2 is that, based on the radiographic inspection device 100, the radiographic inspection device 100' also includes an auxiliary shielding curtain 4 and an auxiliary driving mechanism 5'. The auxiliary shielding curtain 4 is mounted at a second opening 112 of the inspection space 11 connecting to an outside. The auxiliary driving mechanism 5' is mounted on the support frame 1 and is configured to drive the auxiliary shielding curtain 4 to move, so as to open or close the second opening 112, and allow the object 200 to pass through the second opening 112 on the transfer mechanism 2 and move outside the inspection space 11.

In an exemplary embodiment, with reference to FIGS. 9 to 10, the radiographic inspection device 100' also includes an auxiliary detection apparatus 9'. The auxiliary shielding curtain 4 located at the second opening 112 is driven to rise by the auxiliary driving mechanism 5', in response to the auxiliary detection apparatus detecting that the object 200 carried on the transfer mechanism 2 is located in the support frame 1 and is getting close to the auxiliary shielding curtain 4 located at the second opening 112, so as to allow the object 200 on the transfer mechanism 2 to move outside the inspection space 11. Correspondingly, the transfer mechanism 2 also includes an output transfer mechanism 23 mounted outside the inspection space 11, so as to receive the inspected object 200 transmitted from an internal transfer mechanism 22.

In an exemplary embodiment, with reference to FIGS. 9 to 10, the radiographic inspection device 100' also includes a fourth detection apparatus 10. The auxiliary driving mechanism 5' drives the auxiliary shielding curtain 4 to fall to an initial position, in response to the fourth detection apparatus 10 detecting that the object 200 carried on the internal transfer mechanism 22 of the transfer mechanism 2 moves outside the support frame 1 away from the auxiliary shielding curtain 4. The auxiliary shielding curtain 4 or the second opening 112 is in a closed state, so as to prevent radiation from leaking.

Although the embodiments of the driving mechanism 5 driving the lifting and falling of the shielding curtain 3 at the first opening 111 are described above, those of ordinary skill in the art may understand that the auxiliary driving mechanism 5' with the same or similar structure may drive the lifting and falling of the auxiliary shielding curtain 4 at the second opening 112, and the driver and the transmission mechanism applicable to the shielding curtain 3 may be the same or similar to the driver and the transmission mechanism applicable to the auxiliary shielding curtain 4. In an alternative exemplary embodiment, one driver may selectively drive the shielding curtain 3 and the auxiliary shielding curtain 4 through a clutch.

In an exemplary embodiment, with reference to FIGS. 3 to 10, the driving mechanism 5 and the auxiliary driving mechanism 5' are applicable to respectively drive the shielding curtain 3 and the auxiliary shielding curtain 4 to rise or fall. Each of the driving mechanism 5 and the auxiliary driving mechanism 5' may include: a driver 51 mounted on the support frame 1; and a transmission mechanism 52. The driver 51 drives one of the two shielding curtains 3 and 4 to rise or fall through the transmission mechanism 52, so as to open or close the entrance or the exit.

In an exemplary embodiment, the first detection apparatus 7, the second detection apparatus 8, the third detection apparatus 9, the auxiliary detection apparatus 9' and the fourth detection apparatus include: light emitting components and light receiving components mounted on two sides of the support frame 1 perpendicular to a movement direction F of the object 200, and the light receiving components are applicable to receive the light emitted by the light emitting components. When the object 200 moves to block beams emitted by the light emitting components, the beams received by the light receiving components decrease or even no beam reaches the light receiving components, thereby detecting that the object 200 moves to a predetermined position. The controller controls the driving mechanism to drive the shielding curtain to rise, fall, or maintain in an original state based on electrical signals generated by optical receiving components indicating that the object has reached the predetermined position.

In an exemplary embodiment, with reference to FIGS. 7 to 8, the shielding curtain 3 or the auxiliary shielding curtain 4 includes a stacked multilayer materials, one layer of the stacked multilayer material is made of a material containing lead. For example, each shielding curtain may be represented as a single panel with an external contour, so as to improve a performance of shielding X-ray of the shielding curtain.

According to another embodiment of the present disclosure, a method of inspecting an object 200 using the radiographic inspection device 100' described in any of the above embodiments is provided, with reference to FIGS. 9 and 10, including the following steps.

An object 200 to be inspected is placed on an input transfer mechanism 21 of the transfer mechanism 2, so that the transfer mechanism drives the object 200 to move in a movement direction F.

When the object 200 to be inspected moves close to the first opening 111, the shielding curtain 3 is driven to rise by the driving mechanism 5, so as to allow the object 200 on the input transfer mechanism 21 of the transfer mechanism 2 to move along the movement direction F to the internal transfer mechanism 22 inside the inspection space 11.

When the object 200 on the internal transfer mechanism 22 of the transfer mechanism 2 moves in the support frame 1 away from the shielding curtain 3, the shielding curtain 3 is driven to fall to an initial position by the driving mechanism 5, and the initial position is a position where a lower end of the shielding curtain 3 is in contact with the transfer mechanism 2.

A radioactive inspection is performed on the object 200 moving on the internal transfer mechanism of the transfer mechanism 2 within the inspection space 11.

When the inspected object 200 within the inspection space 11 moves close to the second opening 112, the auxiliary shielding curtain 4 is driven to rise by the auxiliary driving mechanism 5', so as to allow the object 200 on the internal transfer mechanism of the transfer mechanism 2 to continue to move along the movement direction F to an external output transfer mechanism 23 of the inspection space 11.

Furthermore, when the object on the output transfer mechanism 23 of the transfer mechanism 2 moves outside the support frame 1 away from the auxiliary shielding curtain 4, the auxiliary shielding curtain 4 is driven to fall to an initial position by the auxiliary driving mechanism 5', and the initial position is a position where the lower end of the auxiliary shielding curtain 4 is in contact with the transfer mechanism 2.

It may be understood that the first detection apparatus 7, the second detection apparatus 8, the third detection apparatus 9, the auxiliary detection apparatus 9', and the fourth detection apparatus 10 respectively detect that the object 200 reaches different predetermined positions, that is, a position where the object is getting close to the first opening 111, a position where the object is getting away from the first opening 111, a position where the object is getting close to the second opening 112, and a position where the object is getting away from the second opening 112.

According to the aforementioned embodiments of the present disclosure, the radiographic inspection device may drive the lifting and falling of the shielding curtain by the driving mechanism. It is possible to ensure that lightweight objects may smoothly enter the inspection space for subsequent radiographic scanning. While inspecting the object, it is possible to achieve stricter shielding of X-rays in the inspection space, so as to ensure that the rays are not leaked into the surrounding environments. Furthermore, in order to achieve tighter shielding, even if the shielding curtain is made heavier with a good rigidity, and includes a support plate with greater rigidity, it may avoid a case that the shielding curtain may not be opened by the object during the security inspection process, much less a possibility of leaking of X-rays.

It may be understood by those of ordinary skill in the art that the above-described embodiments are exemplary, and those of ordinary skill in the art may improve them. The structures described in various embodiments may be combined freely in terms of structures or principles not conflicting with each other.

Although the present disclosure has been described with reference to accompanying drawings, embodiments disclosed in the accompanying drawings are intended to illustrate optional embodiments of the present disclosure, and should not be construed as a limitation of the present disclosure. Although embodiments of the present disclosure have been illustrated and described, it may be understood by those of ordinary skill in the art that these embodiments may be changed without departing from the principle and spirit of the present disclosure. The scope of the present disclosure is defined by the appended claims and their equivalents.

What is claimed is:

1. A radiographic inspection device, comprising:
a support frame, wherein an inspection space applicable to inspect an object is formed within the support frame, and the inspection space has a first opening connecting to an outside;
a transfer mechanism applicable to carry the object to move through the inspection space;
a shielding curtain mounted at the first opening; and
a driving mechanism mounted on the support frame and configured to drive the shielding curtain to move, so as to open or close the opening.

2. The radiographic inspection device of claim 1, wherein the driving mechanism comprises:
a driver mounted on the support frame; and
a transmission mechanism, wherein the driver drives the shielding curtain to rise or fall through the transmission mechanism.

3. The radiographic inspection device of claim 2, wherein the driver comprises a motor,
the transmission mechanism comprises:
a first roller mounted on an upper part of the support frame and driven to rotate by the motor;
a second roller mounted on the support frame and located below the first roller;
a conveyor belt wrapped around the first roller and the second roller; and
a joint portion, wherein the shielding curtain is connected to the conveyor belt through the joint portion, so that the shielding curtain is driven to move up and down with the conveyor belt.

4. The radiographic inspection device of claim 3, wherein the joint portion comprises:
a main body portion connected to the conveyor belt; and
a pair of clamping elements, wherein the pair of clamping elements grip an upper end of the shielding curtain and are connected to the main body portion.

5. The radiographic inspection device of claim 4, wherein the main body portion has an approximate shape of isosceles triangle or isosceles trapezoid, and is connected to an approximate middle part of the pair of clamping elements.

6. The radiographic inspection device of claim 3, wherein the transmission mechanism further comprises a first guide mechanism, wherein the first guide mechanism is applicable to guide the joint portion to move up and down.

7. The radiographic inspection device of claim 6, wherein the first guide mechanism comprises:
a guide rail mounted on the support frame; and
a guide block mounted on the joint portion.

8. The radiographic inspection device of claim 3, wherein the transmission mechanism further comprises a counterweight, wherein the counterweight is connected on the other side of the conveyor belt opposite to one side connecting to the joint portion, so as to balance a weight of the joint portion and a weight of the shielding curtain.

9. The radiographic inspection device of claim 8, wherein the transmission mechanism further comprises a second guide mechanism, wherein the second guide mechanism is applicable to guide the counterweight to move up and down.

10. The radiographic inspection device of claim 3, wherein the transmission mechanism further comprises a limiting apparatus, wherein the limiting apparatus is applicable to limit a range of movement of the joint portion in an up and down direction.

11. The radiographic inspection device of claim 10, wherein the limiting apparatus comprises:
a first proximity switch mounted on the support frame; and
a matching switch mounted on the joint portion, wherein the driving mechanism stops driving the shielding curtain to rise in response to the matching switch being close to the first proximity switch.

12. The radiographic inspection device of claim 11, wherein the limiting apparatus comprises:
a second proximity switch mounted on the support frame, wherein the driving mechanism stops driving the shielding curtain to fall in response to the matching switch being close to the second proximity switch.

13. The radiographic inspection device of claim 1, further comprising:
an auxiliary shielding curtain mounted at a second opening of the inspection space connecting to the outside; and
an auxiliary driving mechanism mounted on the support frame and configured to drive the auxiliary shielding curtain to move, so as to open or close the second opening.

14. A method of inspecting an object using the radiographic inspection device of claim 13, comprising:
placing the object to be inspected on the transfer mechanism;
driving the shielding curtain to rise by the driving mechanism when the object to be inspected moves close to the first opening, so as to allow the object on the transfer mechanism to move into the inspection space;
driving the shielding curtain to fall to an initial position by the driving mechanism when the object on the transfer mechanism moves in the support frame away from the shielding curtain;
performing a radioactive inspection on the object moving within the inspection space; and
driving the auxiliary shielding curtain to rise by the auxiliary driving mechanism when the inspected object within the inspection space moves close to the second opening, so as to allow the object to move outside the inspection space.

15. The radiographic inspection device of claim 1, wherein the shielding curtain comprises a stacked multilayer material, one layer of the stacked multilayer material is made of a material containing lead.

16. A method of inspecting an object using the radiographic inspection device of claim 1, comprising:
placing the object to be inspected on the transfer mechanism;
driving the shielding curtain to rise by the driving mechanism when the object to be inspected moves close to the first opening, so as to allow the object to move into the inspection space;

driving the shielding curtain to fall to an initial position by the driving mechanism when the object on the transfer mechanism moves in the support frame away from the shielding curtain;

performing a radioactive inspection on the object moving within the inspection space;

driving the inspected object to move towards the first opening by the transfer mechanism; and driving the shielding curtain to rise by the driving mechanism when the inspected object moves close to the first opening so as to allow the object to move outside the inspection space.

* * * * *